United States Patent [19]  
Kenderdine

[11] Patent Number: 5,055,727  
[45] Date of Patent: Oct. 8, 1991

[54] ROTARY DRIVE MECHANISM
[75] Inventor: Eugene W. Kenderdine, Albuquerque, N. Mex.
[73] Assignee: The United States of America as represented by the United States Department of Energy, Washington, D.C.
[21] Appl. No.: 484,302
[22] Filed: Feb. 26, 1990
[51] Int. Cl.$^5$ ............................................. H02K 7/10
[52] U.S. Cl. ........................................ 310/78; 310/41; 310/49 R
[58] Field of Search .......................... 310/78, 49 R, 41; 335/278, 272

[56] References Cited
U.S. PATENT DOCUMENTS

| | | | |
|---|---|---|---|
| 2,570,518 | 10/1951 | Bryan | 310/78 |
| 2,950,424 | 8/1960 | Smith et al. | 335/276 |
| 3,165,936 | 1/1965 | Daugherty | 310/78 |
| 3,883,758 | 5/1975 | Lechner | 310/41 |

Primary Examiner—Steven L. Stephan  
Assistant Examiner—Matt Nguyen  
Attorney, Agent, or Firm—Anne D. Daniel; James H. Chafin; William R. Moser

[57] ABSTRACT

A rotary drive mechanism includes a rotary solenoid having a stator and multi-poled rotor. A moving member rotates with the rotor and is biased by a biasing device. The biasing device causes a further rotational movement after rotation by the rotary solenoid. Thus, energization of the rotary solenoid moves the member in one direction to one position and biases the biasing device against the member. Subsequently, de-energization of the rotary solenoid causes the biasing device to move the member in the same direction to another position from where the moving member is again movable by energization and de-energization of the rotary solenoid. Preferably, the moving member is a multi-lobed cam having the same number of lobes as the rotor has poles. An anti-overdrive device is also preferably provided for preventing overdrive in the forward direction or a reverse rotation of the moving member and for precisely aligning the moving member.

10 Claims, 1 Drawing Sheet

ROTARY DRIVE MECHANISM

The Government has rights in this invention pursuant to Contract No. DE-AC04-76DP00789 awarded by the U.S. Department of Energy to AT&T Technologies, Inc.

FIELD OF THE INVENTION

The present invention relates generally to rotary drive mechanisms, and more particularly to a rotary drive mechanism using a rotary solenoid which advances to a first position when energized and then further advances to a second position when de-energized.

Background of the Invention

During the handling, storage, transporting, and deployment of weapons, it is inevitable that accidents will occur. With nuclear weapons, it is mandatory that such accidents not result in nuclear detonation. "Stronglinks" are one of several interlocks on each weapon designed to prevent accidental detonation in the event of abnormal environments (impact, fire, crush, etc.).

Stronglinks are electromechanical devices that prevent energy from being applied through a "barrier" to certain components in an "exclusion" region unless there is human intent that such energy be applied. The stronglink is an energy gating (or switching) mechanism with a built-in "combination lock". The only combination that will open this lock is an electrical unique signal which allows the device to be driven from a "safed" state to an "enabled" state.

Stronglinks are generally "one-shot", single try devices. Each weapon system contains two stronglinks of different designs that respond to different unique signal electrical pulse patterns. This is to prevent the possibility of a common mode of failure in the event of some unforeseen weakness in one device. Stronglinks have three major components: an energy gating mechanism, a discriminator mechanism (combination lock), and a drive mechanism (usually two rotary solenoids).

The discriminator mechanism is a type of mechanical "maze" representing the predetermined electrical unique signal pulse pattern. If the solenoids receive the unique signal, each pulse allows a correct step through the maze. An incorrect pulse pattern leads up a "blind alley" in the maze, causing stronglink lockup.

Past stronglinks have contained one of two general types of discriminator mechanisms. The first type features a gate (or two gates) working in conjunction with a discriminator wheel containing two rows of some type of teeth about the periphery of the wheel. One of the rows contains groups of teeth representing unique signal "A" events, the other "B" events. Where there is a group of teeth in one row, there are corresponding voids in the other row. When the "A" event gate is closed, the "B" event gate is open and vice versa. The enabling logic thus requires the gate to be opened for the row with advancing teeth while the other gate is closed in the area of the voids. After a group of teeth in one row has passed through its gate, the gates must change states to allow for passage of teeth in the other row. If a tooth advances into a closed gate, it is blocked, and the gate can no longer be opened so that lockup has occurred.

The second type of discriminator mechanism uses a type of pawl-rachet wheel mechanism for signal discrimination. The rachet wheel contains "shallow" drive teeth and "deep" penalty teeth in groups representing the unique signal. The enabling logic requires the pawl to drive the rachet wheel only on the shallow teeth and to "skip" over the deeper penalty teeth. With an incorrect signal, the pawl becomes "trapped" in the deep tooth, blocking the discriminator wheel from further advancement and again requiring manual access to reset the device.

The drive mechanisms used for these prior stronglink discriminator mechanisms have generally been two four-pole cylindrically-shaped rotary solenoids which receive incoming electrical pulse patterns and drive the discriminator mechanism. Rotary solenoids are used since they are more readily balanced against G forces than linear solenoids. The solenoid rotors operate between two stop pins, impacting one pin when energized and the other when de-energized. The rotor stretches an extension spring or winds a torsion spring during the energized stroke. The spring thus returns the rotor in the opposite direction when the solenoid is de-energized. This oscillatory motion is converted to a rotary motion by the discriminator pawl-rachet wheel mechanism. The drive pawl picks up a new rachet wheel tooth on the energized stroke and advances the rachet wheel one unique position on the de-energized spring return stroke (representing one unique signal event).

The use of oscillatory rotary solenoids has a number of disadvantages. The stop pins limit the travel of the Solenoid Rotor, thus resulting in a waste of energy. In addition, "bounce" conditions during impact between the rotor and its energized position stop pin may cause "double pulsing". Further, besides these dynamic problems, the axial length of the solenoid cylindrical housing is too great for a desired "flat pack" stronglink geometry.

Various rotary drive mechanisms have been disclosed in prior art patents. For example, in U.S. Pat. No. 3,011,100 (Spinelli et al), a magnetic motor is disclosed having an armature which oscillates between two positions. The motor combines the magnetic forces with toggle springs and two single pole, double throw switches to attain two discrete positions. The armature actuates locking linkages.

In U.S. Pat. No. 3,164,732 (Molitor) a device including a spiral rotor and stator poles is disclosed in which the displacement of the rotor is limited. The coil is electrically energized and oscillates in the opposite direction when de-energized by a spring return. When power is applied, besides advancing the rotor, a magnetic detent pin is engaged with the output shaft causing the rotor to advance the shaft. When power is removed, the detent pin is disengaged, causing the rotor to leave the output shaft in its advanced position as the rotor backs up to its de-energized position. The output shaft steps only during the energized stroke, providing a single step per on-off cycle. A magnetic clutch (detent pin) is thus required to convert from the oscillatory rotary motion to the unidirectional output shaft motion.

In U.S. Pat. No. 3,391,289 (Danilewicz et ak), an electromagnetic stepping device is disclosed which contains dual concentric armatures to provide the stepped unidirectional rotary output. The outer armature oscillates through a fixed angular displacement, being forced forward magnetically, and having a spring return when de-energized. The inner armature acts as a magnetic rachet wheel, advancing forward one step when the coil is energized and staying in this new position when de-energized. The placement of the poles on the inner and outer armatures, and on the stator, is such that when the coil is energized the outer spring loaded armature advances. This in turn aligns the poles such that the inner armature advances. When power is removed, the outer armature returns, aligning with a new set of inner armature poles. The inner armature may or may not have a magnetic detent pin to restrain it in its advanced position. This device, while having a unidirectional advancing rotor, requires a second spring loaded oscillating rotor for operation. It provides a single step per on-off electrical pulse, advancing on the energized stroke.

In U.S. Pat. No. 3,477,046 (Pigeon et al), a device including a rotating cam designed to actuate multiple reed switches in a desired sequence is disclosed. A permanent magnet is used in conjunction with the cam to open and close the switches.

In U.S. Pat. No. 3,693,124 (Ganowsky), a rotary stepping solenoid is provided which has a rotary, unidirectional, stepped output. The device includes an aperture that operates like a hinged trap door. A spring keeps the "door" slightly open against a mechanical stop. When energized, the door closes against the stator. The output shaft lies below the center of the trap door (approximately perpendicular to the door). The underside of the armature (door) contains a cam slot. The headed end of the shaft has multiple cam slots facing the underside of the trap door. A steel ball rides between the door and shaft in the door cam slot in one of the output shaft multiple cam slots. When the solenoid coil is energized the armature (door) begins to close, driving the ball down the ramp of one of the output shaft cam slots. This axial force against the ball causes the shaft to rotate as the ball is forced down the ramp. When the coil is de-energized, the trap door reopens and the ball is forced back up the ramp to a new cam slot on the output shaft. An oscillatory motion of the armature is thus converted to a rotary shaft motion, through the cam and ball structure. It should also be appreciated that a single step is obtained per on-off pulse cycle, during the energized state.

SUMMARY OF THE INVENTION

In accordance with the present invention, a rotary drive mechanism which is usable with a stronglink mechanism is provided. The rotary drive mechanism includes a rotary solenoid having a stator and multipoled rotor. A moving member rotates with the rotor. A biasing means biases the member for a further rotational movement after rotation by the rotary solenoid. Thus, energization of the rotary solenoid moves the member in one direction to one position and biases the biasing means against the member. Thereafter, de-energization of the rotary solenoid causes or allows the biasing means to move the member in the same direction to another position from where the moving member is again movable in the same direction by energization and de-energization of the rotary solenoid.

Preferably, the moving member is a multi-lobed cam having the same number of lobes as the rotor has poles. In addition, the biasing means includes a cam follower, a mounting means for mounting the cam follower to travel along the lobes of the multi-lobed cam, and a spring means connected to the mounting means. The spring means urges the cam follower against an associated lobe to cause the multi-lobed cam to move in the same direction after the solenoid is de-energized. Initially, the spring means is moved to an urging configuration (where it can urge the cam follower) by the movement of the lobe as the multi-lobed cam is moved to the first position.

In a preferred embodiment of the invention, an anti-overdrive means is also provided for preventing a reverse rotation of the moving member. This anti-overdrive means includes a rachet cam which rotates with the moving member, first and second rachet cam followers which engage the rachet cam and which are angularly staggered from one another, and first and second urging means for urging respective first and second rachet cam followers toward the center of the rachet cam. Thus, respective rachet cam followers engage the rachet cam to prevent a reverse motion and to hold the rachet cam and hence the moving member stationary when the moving member is in respective first and second positions.

In the preferred embodiment, the multi-lobed cam has four lobes. In addition, the stator is horseshoe-shaped in order for the rotary drive mechanism to be as compact as possible.

It is an advantage of the present invention that the solenoid provides an advancing output on both the energizing and de-energizing of the solenoid. Thus, where the rotary drive mechanism of the present invention is used in a stronglink mechanism, the solenoid acts to advance the discriminator mechanism one position during the energized stroke and one additional position during the de-energized stroke. This thus allows the discriminator mechanism to advance a given number of positions with one half of the number of on-off cycles of the solenoid.

It is also an advantage of the present invention that the available energy is used much more efficiently. Thus, where prior art devices drove the discriminator mechanism on either the solenoid energized stroke or the de-energized stroke, one direction of the solenoid oscillatory motion did nothing towards the advancement of the mechanism and thus was very wasteful of available energy. However, with the present invention, advancement occurs on both the energization and de-energization of the solenoid, so there is much less waste of this available energy.

Yet another advantage of the present invention is that a more positive detenting action is obtained.

Still another further advantage of the present invention is that a simple gear drive is directly connected to the rotary solenoid as there is no longer any necessity to convert oscillatory motion to rotary motion as with prior art devices. Thus, the continual impacting and drag of a ratcheting operation in a pawl-rachet wheel mechaninsm is eliminated so that wear, friction, and dynamic problems are also eliminated.

The cam can also be contoured to "match" the magnetic torque-displacement curve of the solenoid, so that the shape of this curve is immaterial. The only critical feature of the curve is the area (energy) under the curve. With oscillatory devices, it is very difficult to match solenoid output torques with spring torques.

The unidirectional rotary drive mechanism of the present invention also has advantages compared to a stepper motor. The stepper motor requires sequential energizing of multiple coils to achieve its action (versus the rotary solenoid single coil). For comparable housing volumes, the individual coils and magnetic flux paths associated with the stepper motor structure are necessarily smaller. They thus produce much less torque for a much smaller displacement. The stepper motor requires a more complex programmer to sequentially energize the coils than is required for the simple on-off pulses of the rotary solenoid. Finally, while the bi-directional capabilities of the stepper motor might have advantages for other applications, this capability is not an advantage for existing discriminator mechanisms since the stronglinks are one-shot, single try devices with the ability to "back out" of a locked position not desired.

Other features and advantages of the present invention are discussed in or apparent from a detailed description of a presently preferred embodiment of the invention found hereinbelow.

DETAILED DESCRIPTION OF THE PREFERRED EMBODIMENT

Figure 1:
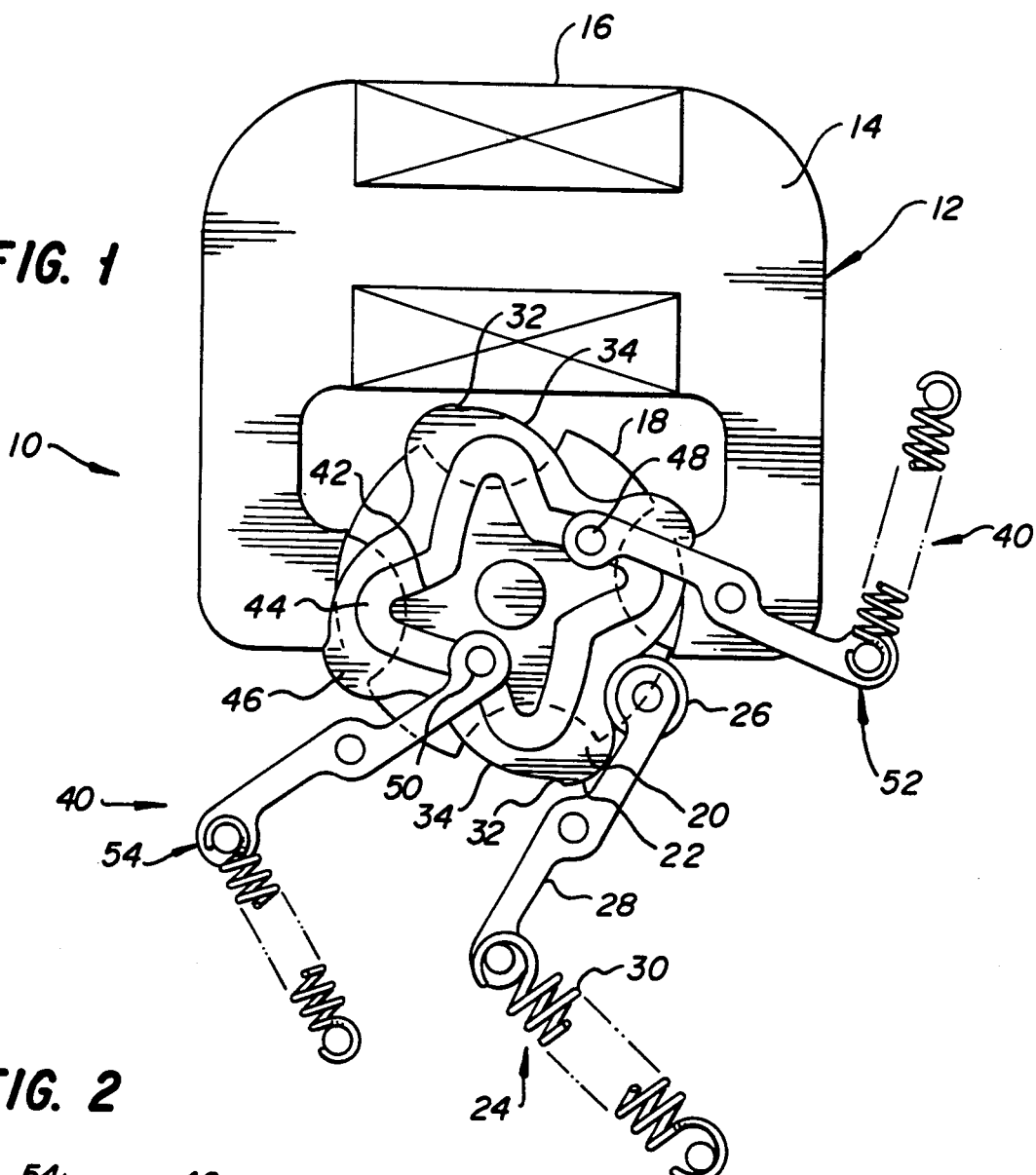
FIG. 1 is a schematic elevation view of a rotary drive mechanism according to the present invention.
Figure 2:
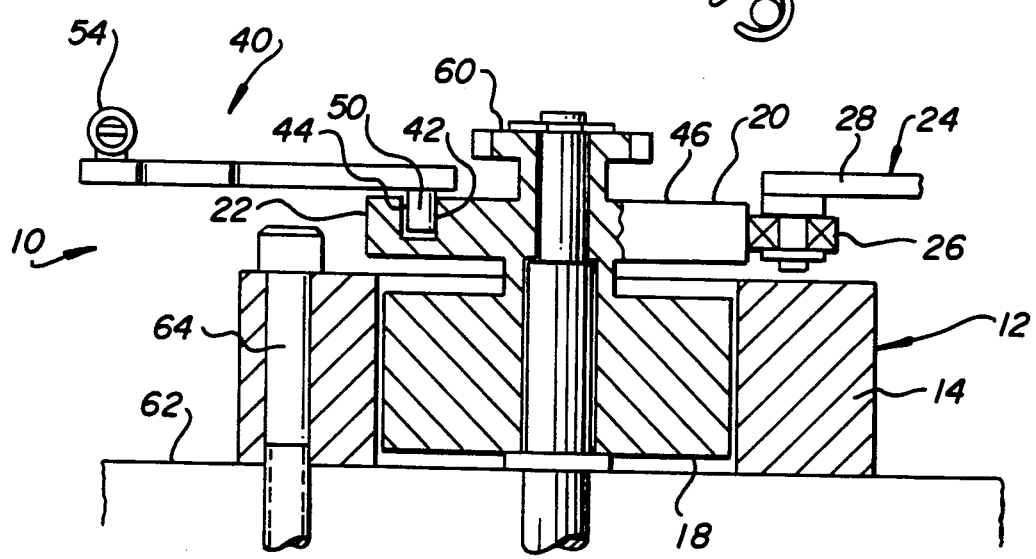
FIG. 2 is a functional schematic plan view of the driving portion of a rotary drive mechanism according to the present invention with portions cut away and various elements oriented for illustrative purposes only and not in correspondence with FIG. 1.

With reference now to the drawings in which like numerals represent like elements throughout the two views, a rotary drive mechanism 10 according to the present invention is depicted in FIGS. 1 and 2. Rotary drive mechanism 10 includes a rotary solenoid 12 including a two-pole horseshoe stator 14 having a coil 16 mounted thereto and a four-pole rotor 18. It should be appreciated that the principles of the present invention can be provided to solenoids having various numbers of poles and housing-stator configurations.

Mounted to rotor 18 is a moving member 20 which in this preferred embodiment takes the form of a four-lobed cam 22, having the same number of lobes as rotor 18 has poles. A biasing means 24 is provided for biasing moving member 20 for further rotational movement (along the downside of a cam lobe) as will be explained subsequently. Biasing means 24 conveniently includes a cam follower 26, a mounting means 28 for cam follower 26, and a spring means 30 which biases cam follower 26 against cam 22.

It should be appreciated that cam follower 26 detents cam 22 when rotary solenoid 12 is in the de-energized condition (at the 5° position), that is, cam follower 26 is at a root of cam 22. When power is applied to rotary solenoid 12, rotor 18 and cam 22 move counter-clockwise, causing cam follower 26 to run "uphill" on cam 22 and hence stretching spring means 30 (an energy storage). At approximately 42°, cam follower 26 reaches the cam apex (where energy storage is completed) and starts "downhill". From 42° to 45°, the solenoid magnetic torque and spring means torque are additive. At 45°, rotor 18 and two of the poles of stator 14 are aligned, giving zero solenoid torque. At this point, spring means 30 overpowers the magnetic torque, "extracting" the poles of rotor 18 from stator 14 in the same counter-clockwise direction. At 50°, rotor 18 magnetically detents, until power is subsequently removed. After power removal, spring means 30 continues to advance cam follower 26 downhill along a cam lobe to the 95° position, where the cycle is ready to repeat.

It should be appreciated that at the 50° detent position, the downhill portion of the cam lobe of cam 22 has an inflection point 32 where a relatively steep slope is provided from the 42° to 50° position. Thereafter, a more shallow slope 34 is provided from the 50° to 95° position. As indicated above, between 45° and 50°, spring means 30 overcomes the magnetic torque and forces rotor 18 forward. Beyond 50°, spring means 30 is weaker than rotary solenoid 12. Thus, so long as power is on, rotor 18 cannot back up or go forward. However, upon removal of solenoid power, rotor 18 continues in the counter-clockwise direction. Thus, there is a magnetic detent at the energized position (50°), and a spring detent at the de-energized position (5° or 95°), with the two detents being 45° apart.

It should be appreciated that the maximum electromagnetic energy available, typically shown in torque displacement curves, is the area under the solenoid torque-displacement curve from 0° to 45°. At 0°, the rotor poles symmetrically straddle the stator poles, producing zero electromagnetic torque. At 45° the rotor and stator poles are aligned, again producing zero torque. Rotor 18 starts, somewhat arbitrarily, at the 5° position (de-energized) to allow for piece part tolerances. From 45° to 50°, there is a negative, reverse image of the torque from 40° to 45°. The net energy available is the total solenoid energy from 0° to 45° minus the energy (area) from 0° to 5° and minus the energy (negative) from 45° to 50°. If a constant output torque is desirable during the energized and de-energized strokes, then the net energy available is divided by 90° (in radians) to give a constant forward torque value. For a selected spring and moment arm of spring means 30, cam 22 is then profiled so that during energy storage and release the algebraic sum of the spring and electromagnetic torques must equal the constant forward torque value in the forward direction.

Rotary drive mechanism 10 of the present invention also includes an anti-overdrive means 40 which prevents a reverse rotation of moving member 20. Anti-overdrive means 40 is a hold pawl-type mechanism which includes a four-lobed rachet cam 42 which is conveniently provided by a channel 44 machined in a face 46 of moving member 20. Riding in channel 44 are respective rachet cam followers in the form of pins 48 and 50 which are staggered at 45° (or some odd multiple of 45°) from one another. Respective urging means 52 and 54 urge pins 48 and 50 inwardly toward the center of moving member 20. Thus, pins 48 and 50 provide a "normal" hold pawl function on rachet cam 42 to prevent moving member 20 from backing up. Pins 48 and 50 ride up the "saw tooth" of the lobes of rachet cam 42 and then tend to snap inboard behind the tooth. The backside of the tooth is a constant radius about the pawl pivot point so that the spring loaded pin will ramp up the inside surface of the tooth and then tend to ramp off the top of the tooth (due to inertia) to the outer top radius so as to be forced "around" the bend to the trailing side of the constant radiused backside of the tooth.

The very high deceleration force, combined with friction, will momentarily bring the respective pin 48 or 50 to a halt as moving member 20 seeks a neutral position, at which time moving member 20 will try to bounce backwards. The respective pins 48 or 50 will then impact the forward side of rachet cam 42, dropping inboard slightly as the pin crosses from the back to the front of channel 44. In this fashion, the respective pin 48 or 50 staggers back and forth down channel 44 until it reaches the bottom of a "tooth". Thus, anti-overdrive means 40 and cam follower 26 are oriented so that in the nominal cam detent positions, the respective pin 48 or 50 passes through the center of the constant radiused slot with some clearance on either side. The intent of anti-overdrive means 40 is to remove enough energy during the staggered impacts so as to eliminate bounce (overdrive) by the time that the respective pin 48 or 50 comes to rest at the bottom of the tooth. By the use of two pins 48 and 50 staggered at 45° and four teeth forming rachet cam 42 at 90°, as opposed to one pawl and eight teeth at 45°, it is possible to allow for a larger pin and a wider channel to aid in machining.

For convenience, an output gear 60 is conveniently integrally provided with moving member 20 as depicted in FIG. 2. Further, rotary solenoid 12 is conveniently mounted to a base 62 by bolts 64 (only one of which is shown).

As indicated above, the operation of rotary drive mechanism 10 results in a first 45° movement in the counter-clockwise direction of output gear 60 when rotary solenoid 12 is energized. Thereafter, whenever rotary solenoid 12 is de-energized, a further 45° rotation in the counter-clockwise direction of output gear 60 is achieved by the action of biasing means 24 acting through cam follower 26 on cam 22. Anti-overdrive means 40 serves to positively orient moving member 20 and hence output gear 60 precisely at each 45° increment of movement.

While the present invention has been described with respect to exemplary thereof, the invention is not limited to the specific examples given, and it will be understood by those of ordinary skill in the art that variations and modifications can be made to the present invention without departing from the spirit and scope of this invention.

I claim:

1. A rotary drive mechanism comprising:
   a rotary solenoid including a stator and multi-poled rotor;
   a moving member which rotates with said rotor; and
   a biasing means for biasing said member for a further rotational movement after rotation by said rotary solenoid whereby energization of said rotary solenoid moves said member in one direction to one position and biases said biasing means against said member and de-energization of said rotary solenoid causes said biasing means to move said member in the same direction to another position from where said moving member is again movable by energization and de-energization of said rotary solenoid.

2. A rotary drive mechanism as claimed in claim 1 wherein said stator comprises at least one pole and wherein the number of said poles of said stator differ from the number of said poles of said rotor.

3. A rotary drive mechanism as claimed in claim 1 wherein said moving member is a multi-lobed cam having the same number of lobes as said rotor has poles.

4. A rotary drive mechanism as claimed in claim 3 wherein said biasing means includes a cam follower, a mounting means for mounting said cam follower to travel along said lobes of said multi-lobed cam, and a spring means connected to said mounting means for urging said cam follower against an associated said lobe to cause said multi-lobed cam to move in the same direction after said solenoid is de-energized with said spring means being moved to an urging configuration to urge said cam follower by the movement of said lobe as said multi-lobed cam is moved first to the one position.

5. A rotary drive mechanism as claimed in claim 3 wherein said stator is horseshoe-shaped.

6. A rotary drive mechanism as claimed in claim 1 and further including an anti-overdrive means operably connected to said moving member for preventing a reverse rotation of said moving member and for preventing overdrive in the forward direction.

7. A rotary drive mechanism as claimed in claim 6 wherein said anti-overdrive means includes a rachet cam which rotates with said moving member, first and second rachet cam followers which engage said ratchet cam and which are angularly staggered from one another, and first and second urging means for urging respective said first and second ratchet cam followers against said ratchet cam whereby respective said ratchet cam followers engage said ratchet cam to prevent a reverse motion and to hold said ratchet cam and hence said moving member stationary when said moving member is in respective one and another positions.

8. A rotary drive mechanism as claimed in claim 7 wherein said moving member is a multi-lobed cam having the same number of lobes as said rotor has poles.

9. A rotary drive mechanism as claimed in claim 8 wherein said biasing means includes a cam follower, a mounting means for mounting said cam follower to travel along said lobes of said multi-lobed cam, and a spring means connected to said mounting means for urging said cam follower against an associtated said lobe to cause said multi-lobed cam to move in the same direction after said solenoid is de-energized with said spring means being moved to an urging configuration to urge said cam follower by the movement of said lobe as said multi-lobed cam is moved first to the one position.

10. A rotary drive mechanism as claimed in claim 9 wherein said multi-lobed cam has 4 lobes.

* * * * *